United States Patent [19]
Hawkins et al.

[11] Patent Number: 5,209,147
[45] Date of Patent: May 11, 1993

[54] STAND FOR LATHING TOOL HOLDER

[76] Inventors: Steven W. Hawkins, 7812 SE. Harney St., Portland, Oreg. 97206; Marvin L. Estes, 2313 NW. Eleven Mile Ave., Gresham, Oreg. 97030

[21] Appl. No.: 394,219

[22] Filed: Aug. 15, 1989

[51] Int. Cl.⁵ .................. B23B 29/12; B23B 29/24
[52] U.S. Cl. ................................. 82/161; 82/158; 82/159; 211/70.6
[58] Field of Search .................... 82/158, 160, 161; 211/69, 70.6, 1.51-1.57; 269/95, 99

[56] References Cited

U.S. PATENT DOCUMENTS

| 971,226 | 9/1910 | Turner. | |
|---|---|---|---|
| 2,475,049 | 7/1949 | Premo. | |
| 2,811,886 | 11/1957 | Pedersen et al. | 82/161 |
| 2,878,705 | 3/1959 | Hipvonen. | |
| 3,024,686 | 3/1962 | Daugusta | 82/161 |
| 3,425,305 | 2/1969 | Cocco. | |
| 3,602,077 | 8/1971 | Mitchell. | |
| 3,738,206 | 6/1973 | Parsons | 22/161 |
| 4,164,879 | 8/1979 | Martin. | |
| 4,164,880 | 8/1979 | Di Marco. | |

FOREIGN PATENT DOCUMENTS

| 873030 | 4/1953 | Fed. Rep. of Germany | 82/161 |
|---|---|---|---|
| 1552502 | 12/1969 | Fed. Rep. of Germany | 82/161 |
| 0695058 | 12/1930 | France | 82/159 |
| 0673426 | 3/1990 | Switzerland | 211/70.6 |
| 163533 | 5/1921 | United Kingdom | 82/161 |
| 661450 | 11/1951 | United Kingdom | 82/161 |
| 735781 | 2/1952 | United Kingdom | 82/161 |

OTHER PUBLICATIONS

KDK Catalogue, 10601 Otis Street, South Gate, Calif., Apr. 1954.
Aloris Catalogue, 131-37 Sanford Ave., Flushing 55, New York, Apr. 1954.

Primary Examiner—Bruce M. Kisliuk
Assistant Examiner—John A. Marlott
Attorney, Agent, or Firm—Stoel Rives Boley Jones & Grey

[57] ABSTRACT

A stand (10) that includes an upwardly projecting support member (24) shaped into wedge portions (36, 38), each wedge portion configured to fit within the groove (18) formed in a conventional holder (14) for a lathing tool. The stand (10) provides a compact and convenient mechanism for storing holders that are not fastened to the lathe.

7 Claims, 1 Drawing Sheet

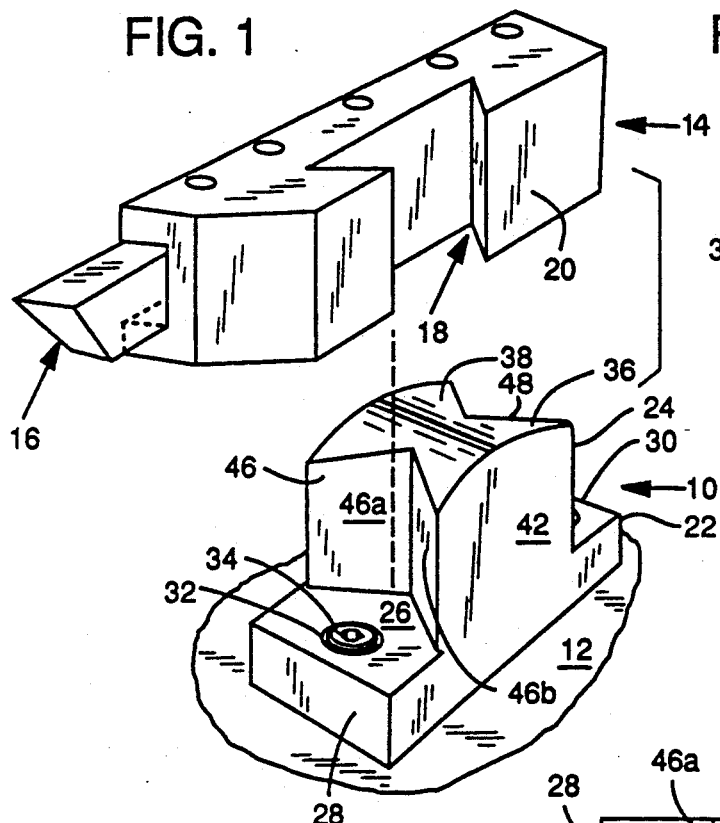
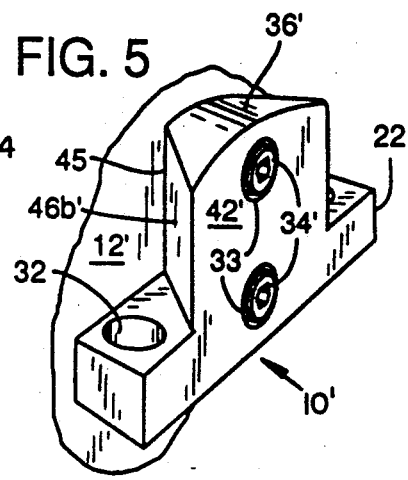
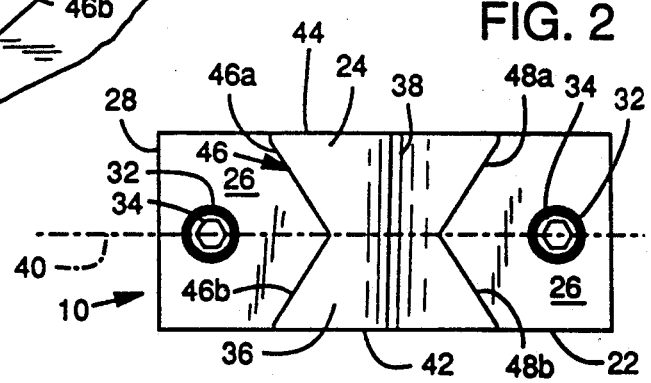
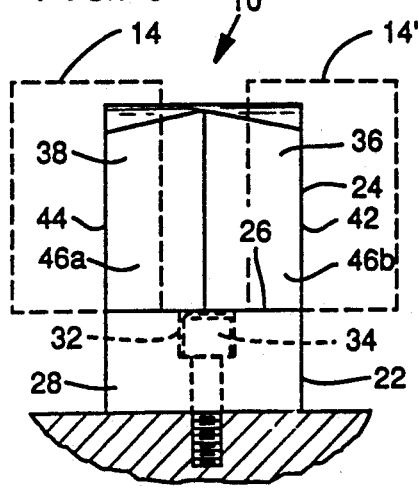
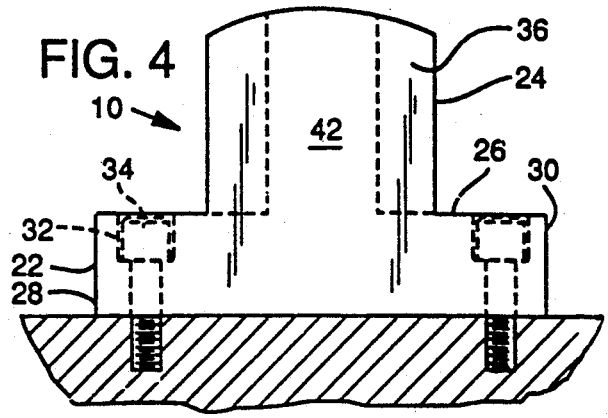

STAND FOR LATHING TOOL HOLDER

TECHNICAL FIELD

This invention is directed to a stand for supporting a lathing tool holder.

BACKGROUND INFORMATION

A conventional lathe includes mechanisms for mounting and rotating a workpiece. Lathing tools are fastened to the lathe near the workpiece. As the workpiece is rotated, the lathing tool is directed to cut material from the workpiece to transform the workpiece into the desired configuration.

The lathing tool is mounted to a holder, and the holder is fastened to the lathe. The tool holder is locked to the lathe by a mechanism known as a tool post. The tool post is designed to permit rapid changing of holders so that various tools can be readily employed during the lathing operation.

Several lathing tools, hence, several holders, may be required for complex lathing operations. Whenever a lathing tool and holder are not in use, the holder should be stored so that the lathing tool will not be lost or damaged. The tool and holder should be stored so that they remain readily accessible to the lathe operator.

SUMMARY OF THE INVENTION

This invention is directed to a stand for a lathing tool holder. The stand of the present invention provides a compact mechanism for storing tool holders so that the tool is protected from damage and is readily accessible to the lathe operator.

BRIEF DESCRIPTION OF THE DRAWINGS

FIG. 1 is a perspective view of the stand of the present invention showing the stand receiving a conventional lathing tool holder.

FIG. 2 is a top view of the stand of the present invention.

FIG. 3 is an end view of the stand of the present invention.

FIG. 4 is a side view of the stand of the present invention.

FIG. 5 is perspective view of an alternative embodiment of the stand.

DETAILED DESCRIPTION OF PREFERRED EMBODIMENTS

Referring to FIGS. 1-4, the tool stand 10 of the present invention is shown fastened to a work surface 12. The stand 10 is configured to support conventional lathing tool holders, such as the single holder shown at 14 in FIG. 1. The holder 14 has mounted to it a lathing tool 16.

The holder 14 includes a groove 18 formed on one side 20 thereof. The groove 18 is generally trapezoidal in cross section, and serves to permit the holder 14 to be fastened to the lathe by known mechanisms, such as a tool post (not shown).

The stand 10 of the present invention provides a storage mechanism for the tool holder 14 whenever the holder 14 is not fastened to the lathe. The stand 10 can be made of any rigid material, such as plastic or metal, and particularly comprises a flat base portion 22 and an integrally formed support member 24 projecting upwardly from the top surface 26 of the base 22.

The support member 24 is located between the ends 28, 30 of the base 22. A countersunk aperture 32 is formed through the base 22 near each end 28, 30. The apertures 32 receive bolts 34 that may be threaded into the work surface 12 to anchor the stand 10 thereto.

The support member 24 includes a front wedge portion 36 and a back wedge portion 38. Preferably, the front and back wedge portions 36, 38 are joined at the longitudinal center line 40 (FIG. 2) of the stand 10. The top of the support member 24 is rounded to eliminate exposed sharp corners.

The support member 24 includes a front side surface 42 and a back side surface 44, those surfaces being in parallel planes. One end surface 46 of the support member 24 has two flat portions 46a, 46b that join at the centerline 40 of the stand 10 and diverge outwardly to the respective front side surface 42 and back side surface 44. Accordingly, the end surface 46 is V-shaped as viewed in plan (FIG. 2).

The other end surface 48 of the support member 24 has two flat portions 48a, 48b configured and arranged to provide a V-shaped end surface 48 similar to the first mentioned end surface 46.

In view of the above, it can be appreciated that the wedge portions 36, 38 define in cross section (see FIG. 2) a pair of trapezoids joined at a common side along the centerline 40 of the stand 10. This configuration permits two tool holders to be supported on the stand 10 immediately adjacent to one another as shown in dashed lines in FIG. 3, with 14 and 14' representing a pair of tool holders.

With reference to FIGS. 1 and 3, the tool holder 14 is placed on the stand 10 by aligning the groove 18 in the holder 14 with one wedge portion 38, and sliding the holder 14 until it rests on the top surface 26 of the base 22 of the stand 10. The second holder 14', either inverted or rotated 180 degrees relative to the holder 14 shown in FIG. 1, is slid over the other wedge portion 36 in the same manner as just described with respect to the other holder 14. A holder is removed from the stand 10 by sliding the holder 14 upwardly off of the wedge portion 38.

Although a preferred embodiment of the invention has been described above, it will be clear to one of ordinary skill in the art that various modifications may be made to the stand without departing from the scope of the claimed invention.

For instance, as shown in FIG. 5, the stand 10' may be configured to support only one tool. Such a stand is shaped to define only one wedge portion 36' extending from the base 22'. Further, the stand 10' may include apertures useful for mounting the stand 10', upright, to either a horizontal surface or to a vertical wall 12'. To this end, two countersunk apertures 32' are formed in the base 22', and two other countersunk apertures 34' are formed though the support member 36'. To mount the stand 10' upright to a wall. Fasteners 34' extend through the support member 36' and into the wall 12' to secure the back surface 45 of the stand 10' to the wall 12'.

A stand of the present invention may be configured so that the support member extends upwardly for a distance sufficient to permit two or more holders to be stacked on one wedge portion. Of course, stands may be constructed with wedge portions of different dimensions so that a variety of tool holder sizes may be accommodated.

We claim:

1. A stand for supporting a lathing tool holder, comprising:
   a support base; and
   a support member projecting outwardly from the base and having a cross sectional shape that defines a pair of connected trapezoids with major bases that are substantially parallel to each other, the support member being configured to support articles that have trapezoidal grooves formed therein, and in which the pair of trapezoids have a common minor base.

2. The stand of claim 1 wherein the support member is integrally formed within the support base, and wherein the stand includes apertures formed therein for receiving fasteners that secure the stand to a surface.

3. The stand of claim 2 wherein the apertures are arranged to permit the stand to be mounted upright to a horizontal surface.

4. The stand of claim 1 wherein the support member has a pair of opposite side surfaces and a pair of opposite end surfaces, the side surfaces being substantially flat and parallel, each end surface comprising two contiguous flat portions that define a V shape in cross section.

5. A stand for a lathing tool holder, comprising:
   a support base; and
   a support member projecting outwardly from the base, the support member having at least one wedge-shaped portion configured to slide within a correspondingly shaped groove formed in a tool holder for supporting the holder relative to the stand.

6. The stand of claim 5 wherein the stand includes apertures formed therein for receiving fasteners that secure the stand to a surface.

7. The stand of claim 6 wherein the apertures are arranged to permit the stand to be mounted upright selectively to a vertical surface and to a horizontal surface.

* * * * *